United States Patent Office 3,150,115
Patented Sept. 22, 1964

---

3,150,115
SILARYLENE SILOXANE RESINS OF IMPROVED
HIGH TEMPERATURE STRENGTH
Harold A. Clark and Robert H. Leitheiser, Midland,
Mich., assignors to Dow Corning Corporation, Midland, Mich., a corporation of Michigan
No Drawing. Filed July 25, 1960, Ser. No. 44,855
2 Claims. (Cl. 260—46.5)

This invention relates to certain siloxane resins and to the molded articles made therefrom.

Organosiloxane molding and laminating resins have been employed commercially for many years in applications requiring operation at elevated temperatures, that is 150° C. or above. As is well known, the organosiloxanes possess excellent thermal stability in that they resist degradation by thermal cracking and by oxidation. On the other hand, organosiloxane resins even though they are thermosettting in the sense that they gel and become insoluble upon curing, nevertheless tend to soften when heated at temperatures of 500° F. or above. This is in contrast to such thermoset resins as the phenolics which maintain their hardness up to the point of thermal degradation. Consequently, although the presently employed silicone resins have met with wide acceptance for structural uses their usefulness is hampered by this softening at elevated temperatures which results in loss of mechanical strength. For example, a laminate made of woven glass fabric and the best heretofore known silicone resin may have a flexural strength at room temperature of 45,000 to 50,000 p.s.i. The same laminate, however, will have a strength of only about 19,000 p.s.i. at 500° F. Since silicone resins are designed to operate at elevated temperatures this weakening poses a problem for design engineers. It would be highly desirable, therefore, to make silicone resins which did not exhibit such a drastic drop in strength at elevated temperatures.

It is the object of this invention to provide novel compositions of matter which when molded or laminated will give structural members of improved strength at elevated temperatures. Other objects and advantages will be apparent from the following description.

This invention relates to a copolymer consisting essentially of from 93 to 97 mol percent monophenylsiloxane and from 3 to 7 mol percent of siloxane units of the formula

in which R is phenyl or methyl.

The term "consisting essentially of" as employed in the specification and claims means that the copolymer is essentially of the specified units but may also contain minor amounts of other siloxane units such as monomethylsiloxane units in proportions which do not appreciably affect the high temperature strength of the resin.

The copolymers of this invention are best prepared by the cohydrolysis of the corresponding silanes. This cohydrolysis can be carried out by conventional techniques for cohydrolyzing chlorosilanes. The phenylene linked silicon units are introduced into the copolymer by cohydrolysis of silanes of the formula

with phenyltrichlorosilane.

As can be seen the R groups can be either phenyl or methyl radicals. Thus, applicable silanes include

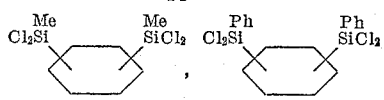

and

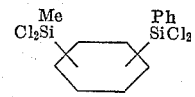

For the purpose of this invention the isomeric arrangement of the two dichlorosilyl groups with respect to each other on the phenyl ring is immaterial. Thus, the groups can be ortho, meta or para to each other or the silane can be a mixture of any two or all of these isomers.

The dichlorosilylbenzenes employed in this invention can be prepared from

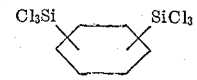

or

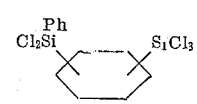

which are obtained by distillation from the residue which remains after the distillation of phenyltrichlorosilane and diphenyldichlorosilane from the reaction product of benzene and trichlorosilane in the presence of boron halide. This method is a commercial one for producing phenyltrichlorosilane and diphenyldichlorosilane.

The materials bis-(trichlorosilyl)benzene and phenyldichlorosilyl-trichlorosilylbenzene are converted into the starting silanes of this invention by reacting them with the appropriate amounts of phenyl and methyl magnesium chloride. These reactions are carried out under the conventional conditions for Grignard reactions. For example, one can react 2 mols of methyl magnesium chloride with 1 mol of bis-(trichlorosilyl)benzene to produce the compound bis-(methyldichlorosilyl)benzene.

The copolymers of this invention can be laminated or molded with inorganic fillers in the conventional manner. Operative fillers include any heat stable fibrous or particulated materials such as glass roving, glass fabric, asbestos fabric, asbestos fibers, powdered silica, diatomaceous earth, sand, clay, aluminum silicate, alumina, titania, magnesium oxide mica, or any other inorganic heat stable particulated or fibrous material.

The compositions of this invention are useful as structural members for aircraft and other automotive equipment.

The following examples are illustrative only and should not be construed as limiting the invention which is properly delineated in the appended claims.

In the specification and claims the following abbreviations are employed: Me for methyl and Ph for phenyl.

*Example 1*

A mixture of 201 g. of phenyltrichlorosilane and 18 g. of a mixture of the meta and para isomers of the silane

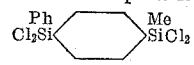

was diluted with 100 g. of toluene and slowly added at 20° C. to a mixture of 200 g. of butyl acetate, 100 g. of toluene, 495 g. of water and 80 g. of isopropanol.

The addition time was about 45 minutes and the hydrolyzate mixture was stirred for 1 hour more at room temperature. The solvent layer containing the siloxane resin was separated, washed with water, then with 5% sodium bicarbonate solution and finally with water. The product was heated to 128° C. to remove low boiling materials. This gave a solution of a siloxane copolymer of 95 mol percent monophenylsiloxane and 5 mol percent units of the formula

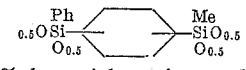

containing 57.9% by weight resin copolymer.

.1% by weight triethanolamine based on the weight of the resin solids was then added to the solution. Pieces of 181 glass cloth were impregnated with the solution to give 34.7% by weight resin pickup. Each piece of impregnated cloth was then heated 4 minutes at 110° C. The impregnated pieces were then stacked in a 6 ply laminate with alternating plys at right angles to each other. The laminate was then molded by heating at 175° C. for 30 minutes at 30 p.s.i. The resin content of the molded laminate was 27.7% by weight.

The laminate was then cured by heating 16 hours at 90° C. and then increasing the temperature at a rate of 16° C. per hour until 250° C. was reached and continuing heating at this temperature for 12 hours. The flexural strength of the 6 ply laminate was then determined at room temperature and at 500° F. The results were as follows: flexural strength at room temperature 50,600 p.s.i., flexural strength at 500° F. 31,000 p.s.i.

By contrast the best previously known silicone laminating resin when formed into a 6 ply laminate under identical conditions gives a room temperature flexural strength of 54,000 p.s.i. and a flexural strength of 19,500 p.s.i. at 500° F.

*Example 2*

Equivalent results are obtained when a copolymer of 95 mole percent monophenylsiloxane and 5 mol percent of siloxane units of the formula

is employed in the process of Example 1.

*Example 3*

Improved high temperature strength is obtained when a copolymer of 96 mol percent monophenylsiloxane and 4 mole percent siloxane units of the formula

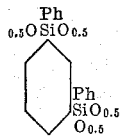

is employed in the procedure of Example 1.

That which is claimed is:

1. As a composition of matter a copolymer consisting essentially of from 93 to 97 mol percent monophenylsiloxane units and from 3 to 7 mol percent siloxane of the unit formula

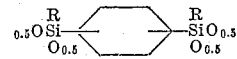

in which R is selected from the group consisting of phenyl and methyl radicals.

2. As an article of manufacture having superior strength at elevated temperature, an inorganic filler bonded into a unitary mass by a cured, insoluble siloxane copolymer consisting essentially of from 93 to 97 mol percent monophenylsiloxane units and from 3 to 7 mol percent siloxane of the unit formula

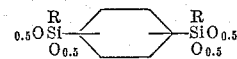

in which R is selected from the group consisting of phenyl and methyl radicals.

References Cited in the file of this patent
UNITED STATES PATENTS 2,352,974    Rochow _____ July 4, 1944

FOREIGN PATENTS 867,507    France _____ Nov. 10, 1941
918,527    Germany _____ Aug. 19, 1954
508,044    Italy _____ Jan. 4, 1955

OTHER REFERENCES

WADC Technical Report 57–143 Part II.
ASTIA-Document No. AD 15 1002 February 1952 pp. 49–52 relied on.